US012595080B1

(12) United States Patent
Chen et al.

(10) Patent No.: US 12,595,080 B1
(45) Date of Patent: Apr. 7, 2026

(54) ON-ORBIT ASSEMBLY AUXILIARY DEVICE FOR SPACE STRUCTURES

(71) Applicant: NANJING UNIVERSITY OF AERONAUTICS AND ASTRONAUTICS, Nanjing (CN)

(72) Inventors: Yiwei Chen, Nanjing (CN); Zhongde Shan, Nanjing (CN); Congze Fan, Nanjing (CN); Jinghua Zheng, Nanjing (CN); Wenzhe Song, Nanjing (CN); Jiaxun Xu, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 0 days.

(21) Appl. No.: 19/365,218

(22) Filed: Oct. 22, 2025

Related U.S. Application Data

(63) Continuation of application No. PCT/CN2025/071939, filed on Jan. 13, 2025.

(30) Foreign Application Priority Data

Nov. 21, 2024 (CN) .......................... 202411672560.1

(51) Int. Cl.
*B64G 99/00* (2009.01)
*B64G 1/22* (2006.01)
(52) U.S. Cl.
CPC ......... *B64G 1/2229* (2023.08); *B64G 1/2223* (2023.08); *B64G 99/00* (2022.08)

(58) Field of Classification Search
CPC . A47B 43/00; A47B 43/04; A47F 5/10; A47F 5/105; A47F 5/132; A47G 25/0685;
(Continued)

(56) References Cited

U.S. PATENT DOCUMENTS 94,567 A * 9/1869 Collins ...................... A47F 7/10
211/195
1,078,248 A * 11/1913 Buchner ................... A47F 5/10
211/149
(Continued)

FOREIGN PATENT DOCUMENTS

CN 106120264 A * 11/2016 ............. D06F 57/08
CN 206173681 U * 5/2017
(Continued)

*Primary Examiner* — Joshua E Rodden
(74) *Attorney, Agent, or Firm* — Bayramoglu Law Offices LLC

(57) ABSTRACT
An on-orbit assembly auxiliary device for space structures includes a plurality of first link rods, one end of the first link rod is hinged with a plurality of second link rods, and an opening assembly for expanding the second link rod is provided on the second link rod; the opening assembly includes a plurality of first hinge rods and third hinge rods, and each of the second link rods is provided with a chute; a first slider and a second slider are slidably provided in each chute; every two adjacent first sliders are rotatably connected through the first hinge rod; every two adjacent second sliders are connected through the third hinge rod; and the first slider close to the first link rod is rotatably connected to the first link rod through the first hinge rod. A rotating assembly for providing rotational force is provided on the top second link rod.

9 Claims, 5 Drawing Sheets

(58) Field of Classification Search
CPC ........ B64G 1/22; B64G 1/222; B64G 1/2221; B64G 1/2222; B64G 1/2223; B64G 1/2224; B64G 1/2225; B64G 1/2226; B64G 1/2228; B64G 1/2229; B64G 1/223; B64G 99/00; D06F 57/06; D06F 57/08; D06F 57/10; E04B 1/34384; E04B 1/344; E04B 1/3441; E04B 1/3445; E05H 15/48; E05H 15/50; E05H 15/505; E05H 15/52; F16H 21/02; G09F 15/0062
USPC ........................ 211/195, 199, 202; 244/159.4
See application file for complete search history.

(56) References Cited

U.S. PATENT DOCUMENTS

| | | | | |
|---|---|---|---|---|
| 4,029,211 | A | * | 6/1977 | Marshall ............ A47G 25/0664 |
| | | | | 211/104 |
| 5,961,738 | A | | 10/1999 | Benton et al. |
| 9,151,069 | B2 | * | 10/2015 | Bobbio .................... B25J 18/02 |
| 2001/0008223 | A1 | * | 7/2001 | Accatino ................ A47F 5/132 |
| | | | | 211/169 |
| 2018/0155922 | A1 | * | 6/2018 | Matsuoka ............. E04B 1/3441 |
| 2019/0207291 | A1 | * | 7/2019 | Harvey ................. H01Q 1/288 |
| 2025/0368358 | A1 | * | 12/2025 | Wilson ................ B64G 1/2224 |

FOREIGN PATENT DOCUMENTS

| | | | | |
|---|---|---|---|---|
| CN | 109779340 | A | | 5/2019 |
| CN | 114104337 | A | | 3/2022 |
| CN | 114604444 | A | | 6/2022 |
| CN | 116552831 | A | | 8/2023 |
| CN | 119238421 | A | | 1/2025 |
| JP | H01151630 | A | | 6/1989 |
| JP | 2001113096 | A | * | 4/2001 |
| JP | 2002220096 | A | | 8/2002 |

* cited by examiner

ON-ORBIT ASSEMBLY AUXILIARY DEVICE FOR SPACE STRUCTURES

CROSS REFERENCE TO THE RELATED APPLICATIONS

This application is a continuation application of International Application No. PCT/CN2025/071939, filed on Jan. 13, 2025, which is based upon and claims priority to Chinese Patent Application No. 202411672560.1, filed on Nov. 21, 2024, the entire contents of which are incorporated herein by reference.

TECHNICAL FIELD

The present invention relates to the technical field of on-orbit assembly, and specifically, to an on-orbit assembly auxiliary device for space structures.

BACKGROUND

As human exploration of space continues to advance, increasing large-scale space structures are being proposed and planned for construction. For example, as the scales of space stations continue to expand, on-orbit assembly of modules is required. The construction of large space telescopes also requires high-precision assembly operations. These complex space structures cannot be fully assembled on the ground before launching, but have to rely on on-orbit assembly technology for launching. Therefore, various forms of on-orbit assembly auxiliary devices for space structures have emerged.

Existing auxiliary devices rely on direct intervention from astronauts for mission planning and execution. The manual intervention can promote some progress in the on-orbit assembly of space structures to a certain extent, but is often accompanied by high risks for astronauts. During the execution of on-orbit assembly, astronauts may face oxygen deficiency and cosmic radiation due to long-time exposure in the space environment.

In summary, how to solve the problems of oxygen deficiency and cosmic radiation that may arise from manual intervention in the prior art has become an urgent challenge in the art. Therefore, it is necessary to propose an on-orbit assembly auxiliary device for space structures.

SUMMARY

To solve the above problems, the present invention discloses an on-orbit assembly auxiliary device for space structures, where the automation and intelligent control of a rotating motor can reduce dependence on manual operation and reduce labor costs and risks caused by manual operation.

In order to achieve the above objective, the technical solution of the present invention is as follows: An on-orbit assembly auxiliary device for space structures includes a plurality of first link rods, one end of the first link rod is hinged with a plurality of second link rods, and an opening assembly for expanding the second link rod is provided on the second link rod. The opening assembly includes a plurality of first hinge rods and third hinge rods, and each of the second link rods is provided with a chute; a first slider and a second slider are slidably provided in each chute; every two adjacent first sliders are rotatably connected through the first hinge rod; every two adjacent second sliders are connected through the third hinge rod; and the first slider close to the first link rod is rotatably connected to the first link rod through the first hinge rod. A rotating assembly for providing rotational force is provided on the top second link rod. The first link rod is detachably connected to the second link rod at the top of each layer through a quick disassembly member; and a support rod is detachably connected to a bottom of the first link rod through a clamping member. A bottom of the support rod is in rotating fit with the second link rod at the top of each layer.

The technical principle of the above solution is as follows: The plurality of second link rods are hinged to the first link rod, and the rotating assembly for providing rotational force is provided on the second link rod at the top, so the second link rods can be expanded or contracted through the rotating motor at the top. The second link rod is provided with the chute allowing the first slider and the second slider to move, and every two adjacent first sliders are rotatably connected through the first hinge rod; and every two adjacent second sliders are connected through the third hinge rod. Therefore, when the second link rod at the top expands outward, the second link rods in the middle can be sequentially driven to expand through the first hinge rods and the third hinge rods. On the contrary, when the second link rod contracts inward, the second link rods in the middle can be sequentially driven to contract towards the first link rods through the first hinge rods and the third hinge rods, thereby opening and closing the second link rods. Through the quick disassembly member, the first link rod and the second link rod at the top of each layer can be connected or disassembled to form an annular structure, or a plurality of sectors are detachably connected to form an annular structure. Through the clamping member, the plurality of support rods can be detachably connected to each other to build a multi-layer support structure.

The above solution has the following beneficial effects:

1. In this solution, the top rotating assembly provides driving force to expand or contract the second link rods, thereby adjusting the spatial structure of the entire device. This design enables the device to flexibly meet different space requirements during assembly and disassembly, thereby improving the flexibility and efficiency of the assembly process.

2. In this solution, the first link rod and the second link rod are connected through the first hinge rod and the third hinge rod, and are in rotating fit through the first slider, the second slider, and the chute, thereby ensuring the stability and reliability of the structure. Meanwhile, the quick disassembly member and the clamping member further increase the connection strength of the structure, making the device more stable under load.

3. In this solution, the device can not only form an annular structure, but also form an annular structure or other complex structures by adjusting the connection methods of the quick disassembly member and the clamping member and detachably connecting a plurality of sectors. The device has broad application prospects in the assembly and maintenance of space structures such as spacecraft and space stations.

Further, the rotating assembly includes a rotating motor, and the rotating motor is electrically connected to a controller; the rotating motor is fixedly connected to the top second link rod through bolts, and an output shaft of the rotating motor is fixedly connected to a hinged position of the top second link rod.

Beneficial effects: The rotating motor is fixedly mounted on the top second link rod, and the output shaft of the rotating motor is fixedly connected to the hinged position of the second link rod. The rotating motor generates a rotational torque during operation, so as to drive the top second link rod to expand or contract. The automation and intelligent control of the rotating motor can reduce dependence on manual operation and reduce labor costs and risks caused by manual operation.

Further, the quick disassembly member includes a plurality of rotating discs and a base, and the rotating discs are all in rotating fit with the base; the base is fixedly connected to an outer wall of the first link rod, and the rotating disc is installed on an outer side of the second link rod at the top of each layer; a cam is fixedly connected to the rotating disc, and an inner wall of the base is provided with a clamping groove for clamping the cam; and a rotating assembly for driving the rotating disc to rotate is provided on the rotating disc.

Beneficial effects: The rotating assembly drives the rotating discs to rotate. The cam is fixedly connected to the rotating disc, and the inner wall of the base is provided with the clamping groove matching the cam, so when the cam rotates to the clamping groove in the base, the cam can be inserted into the clamping groove, thereby achieving a tight connection between the rotating disc and the base. On the contrary, quick disassembly of the rotating disc and the base can be achieved. In this way, quick disassembly and assembly of connecting parts can be achieved, thereby further improving assembly efficiency.

Further, the rotating assembly includes a stepper motor, and the controller is used to control the operation of the stepper motor; an output shaft of the stepper motor is coaxially and fixedly connected to the rotating disc, and the stepper motor is fixedly connected to an outer wall of the second link rod at the top of each layer.

Beneficial effects: The controller sends an electrical pulse signal to the stepper motor when receiving a control instruction, the stepper motor rotates according to the received signal, and its output shaft drives the rotating disc to rotate synchronously, thereby further ensuring the continuity and stability of power transmission and ensuring smooth assembly.

Further, the clamping member includes a plurality of clamping plates arranged annularly, a top of the support rod is provided with an opening, and the clamping plate is located in the opening and is in sliding fit with the opening; the clamping plate is in sliding fit with a strut, and the strut is fixedly connected to the bottom of the first link rod; the top of the support rod is in threaded fit with a nut, and the clamping plate is clamped with an outer end of the opening and the nut; and a driving assembly for driving the nut to rotate is provided on the nut.

Beneficial effects: When the support rod needs to be fixed to the bottom of the first link rod, the strut fixedly connected to the first link rod is placed in the clamping plate arranged annularly, and the clamping plates are closed to each other by tightening the nuts, thereby clamping the strut for fixing. On the contrary, the strut can be released by loosening the nut. The designed clamping plates are highly adaptive to clamped objects of different sizes, shapes, and weights, making the assembly auxiliary device play an important role in various on-orbit assembly scenarios of space structures.

Further, the driving assembly includes a plurality of driving motors, gears, and racks; the driving motor is fixedly connected to an outer side of the support rod, and the controller is used to control the operation of the driving motor; an output shaft of the driving motor is coaxially and fixedly connected to the gear, and the gear meshes with the rack; and the rack is sleeved on an outer side of the nut.

Beneficial effects: The driving motor drives the gear to rotate, and the gear drives the rack meshing with the gear to rotate. As the rack is sleeved on the outer side of the nut and the nut is in threaded fit with the support rod, the rack can drive the nut to rotate outside the support rod, thereby enabling the nut to clamp or loosen the clamping plate. By accurately controlling the operation of the driving motor, the position of the nut can be accurately adjusted, thereby ensuring accurate clamping of a clamped object by the clamping plate.

Further, the annular diameter of the clamping plate at the opening of the support rod is greater than that of the clamping plate inside the opening of the support rod.

Beneficial effects: Based on the principles of leverage and mechanical balance, when the clamping plate has a relatively large annular diameter at the opening of the support rod, the clamping force or supporting force provided by the clamping plate increases correspondingly. A larger diameter means a longer force arm, thereby generating a larger torque under the same force to clamp or support an assembly object more firmly.

Further, a second hinge rod is hinged to an end, away from the rotating motor, of the second link rod; the adjacent second hinge rods are hinged to each other; and the second hinge rod on the side close to the first link rod is hinged to the first link rod.

Beneficial effects: When the second link rod at the top expands outward, the second link rods in the middle are sequentially driven to expand through the first hinge rods. With the expansion of the second link rods, the second hinge rods also expand to form a stable structure. By designing the second hinge rods, the structure is more flexible during expansion and contraction, and the size and shape of the structure can be adjusted as needed.

Further, a vertical rod is detachably clamped and connected to the outer side of each layer of first link rods and second link rods; and a tilt rod is detachably clamped and connected between the vertical rod and the support rod.

Beneficial effects: By designing the vertical rod and the tilt rod, a more stable framework structure can be formed to resist various forces and moments that may be encountered during on-orbit assembly, thereby improving the stability of the device.

Further, the first link rods, the second link rods, the support rods, the vertical rods, and the tilt rods are all made by composite additive manufacturing, while the first hinge rods and the second hinge rods are both made of a shape memory material.

Beneficial effects: The composite material has the advantages of light weight, high strength, corrosion resistance, etc., and is suitable for application in space environments. Through additive manufacturing technology, these components can be directly manufactured in space, thereby reducing launch costs and improving design flexibility. The shape memory material has unique recovery characteristics, can restore to a preset shape at a specific temperature, and can further ensure the opening and closing of the structure, thereby improving stability.

Some of the additional aspects and advantages of the present disclosure will be provided in the following description, and some will become apparent from the following description, or be learned by practice of the present disclosure.

LIST OF REFERENCE NUMERALS

Figure 1:
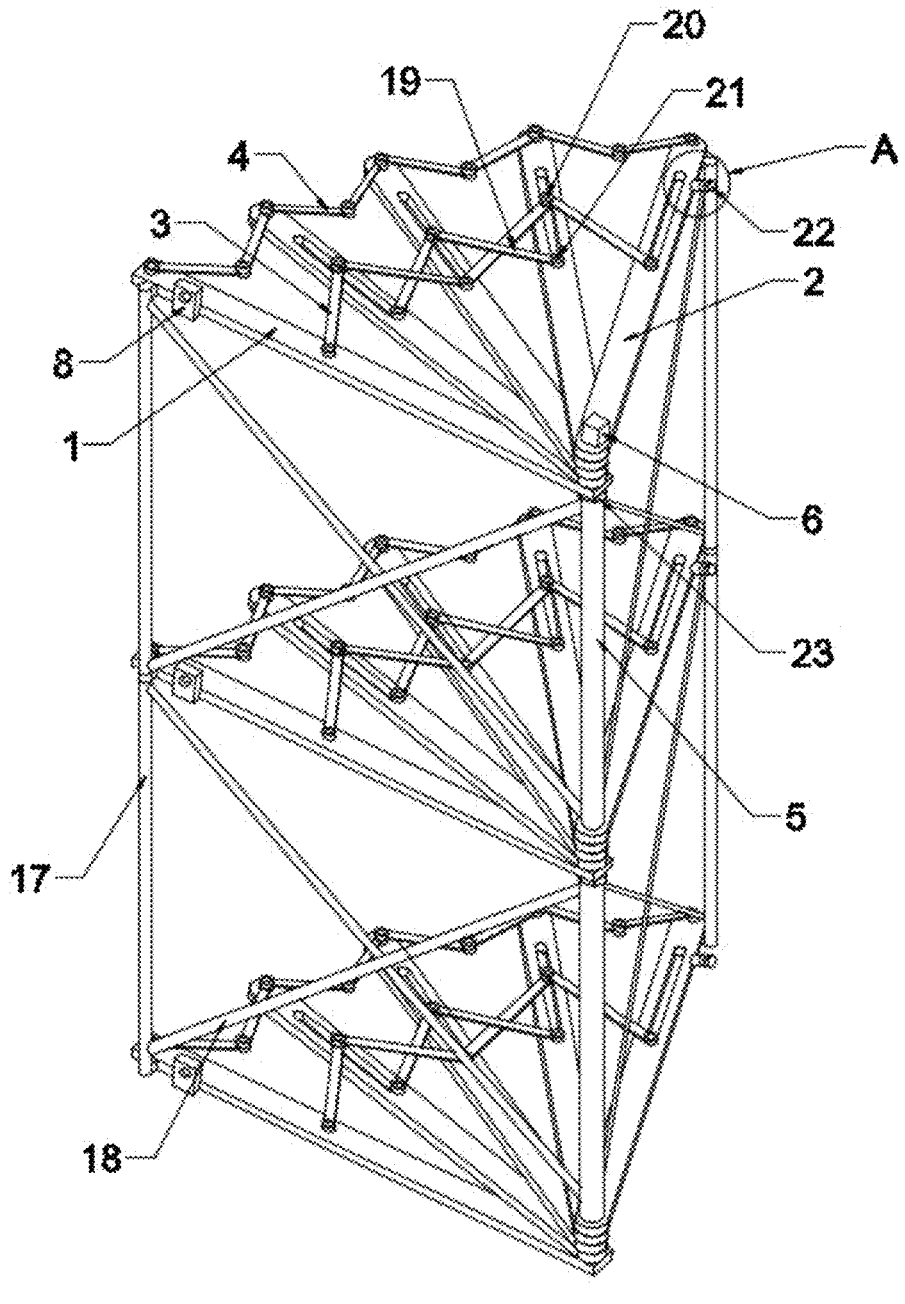
FIG. 1 is an axonometric view of an on-orbit assembly auxiliary device for space structures according to an embodiment of the present invention.

1. First link rod; 2. Second link rod; 3. First hinge rod; 4. Second hinge rod; 5. Support rod; 6. Rotating motor; 7. Rotating disc; 8. Base; 9. Cam; 10. Stepper motor; 11. Clamping plate; 12. Strut; 13. Nut; 14. Driving motor; 15. Gear; 16. Rack; 17. Vertical rod; 18. Tilt rod; 19. Third hinge rod; 20. First slider; 21. Second slider; 22. Quick disassembly member; 23. Clamping member.

DETAILED DESCRIPTION OF THE EMBODIMENTS

The present invention will be further illustrated below in conjunction with the accompanying drawings and specific embodiments. It should be understood that the following specific embodiments are merely used for explaining the present invention, rather than limiting the scope of the present invention. It should be noted that the terms "front", "back", "left", "right", "upper", and "lower" used in the following description refer to the directions in the accompanying drawings, and the terms "inside" and "outside" refer to the directions towards or away from the geometric center of a specific component respectively.

Embodiment 1

As shown in FIG. 1 to FIG. 5, an on-orbit assembly auxiliary device for space structures includes a plurality of first link rods 1, one end of the first link rod 1 is hinged with a plurality of second link rods 2, and an opening assembly for expanding the second link rod 2 is provided on the second link rod 2.

The opening assembly includes a plurality of first hinge rods 3 and third hinge rods 19, and each of the second link rods 2 is provided with a chute; a first slider 20 and a second slider 21 are slidably provided in each chute; every two adjacent first sliders 20 are rotatably connected through the first hinge rod 3; every two adjacent second sliders 21 are connected through the third hinge rod 19; the first slider 20 close to the first link rod 1 is rotatably connected to the first link rod 1 through the first hinge rod 3; and a rotating assembly for providing rotational force is provided on the top second link rod 2.

Figure 5:
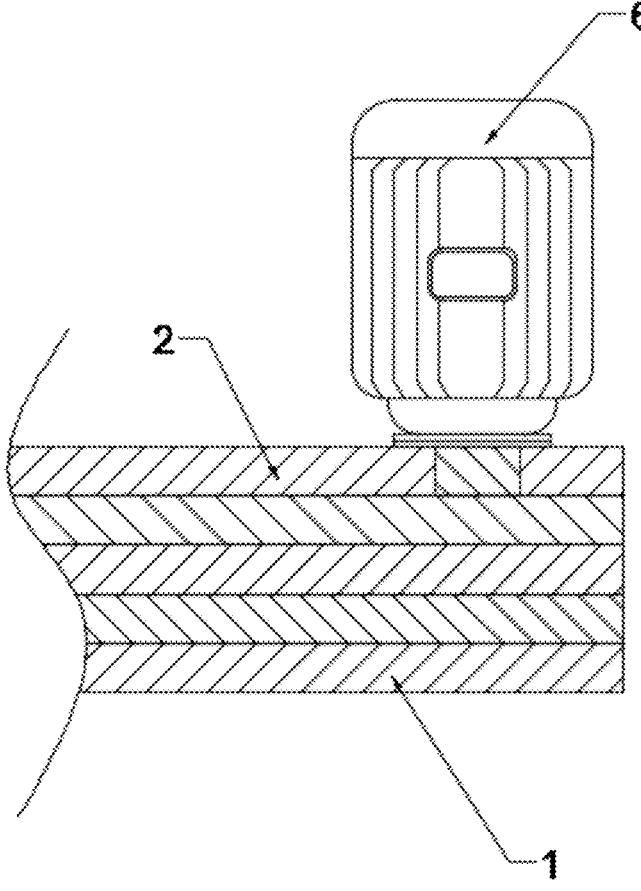
FIG. 5 is a front cross-sectional view of a rotating assembly according to an embodiment of the present invention.

As shown in FIG. 1 and FIG. 5, the rotating assembly includes a rotating motor 6, and the rotating motor 6 is electrically connected to a controller; the rotating motor 6 is fixedly connected to the top second link rod 2 through bolts, and an output shaft of the rotating motor 6 is fixedly connected to a hinged position of the top second link rod 2 through bolts. The rotating motor 6 is fixedly mounted on the top second link rod 2 through bolts, and the output shaft of the rotating motor is fixedly connected to the hinged position of the second link rod 2 through bolts. The rotating motor 6 generates a rotational torque during operation, so as to drive the top second link rod 2 to expand or contract. The automation and intelligent control of the rotating motor 6 can reduce dependence on manual operation and reduce labor costs and risks caused by manual operation.

Figure 2:
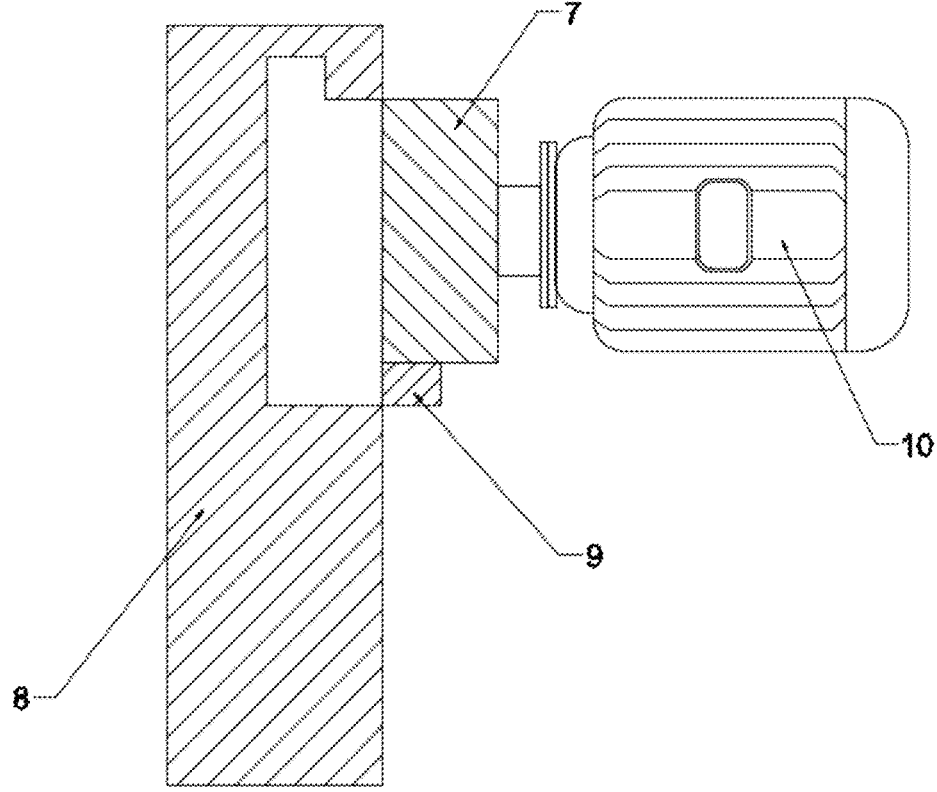
FIG. 2 is a front cross-sectional view of a quick disassembly member of the on-orbit assembly auxiliary device for space structures according to an embodiment of the present invention.

As shown in FIG. 1 and FIG. 2, the first link rod 1 is detachably connected to the second link rod 2 at the top of each layer through a quick disassembly member 22; the quick disassembly member 22 includes a plurality of rotating discs 7 and a base 8, and the rotating discs 7 are all in rotating fit with the base 8; the base 8 is fixedly connected to an outer wall of the first link rod 1 through bolts, and the rotating disc 7 is installed on an outer side of the second link rod 2 at the top of each layer; a cam 9 is fixedly connected to the rotating disc 7 through bolts, and an inner wall of the base 8 is provided with a clamping groove for clamping the cam 9; and a rotating assembly for driving the rotating disc 7 to rotate is provided on the rotating disc 7.

The rotating assembly includes a stepper motor 10, and the controller is used to control the operation of the stepper motor 10; an output shaft of the stepper motor 10 is fixedly connected to the rotating disc 7 through a coaxial bolt, and the stepper motor 10 is fixedly connected to an outer wall of the second link rod 2 at the top of each layer through bolts.

The controller sends an electrical pulse signal to the stepper motor 10 when receiving a control instruction, the stepper motor 10 rotates according to the received signal, and its output shaft drives the rotating disc 7 to rotate synchronously, thereby further ensuring the continuity and stability of power transmission and ensuring smooth assembly. The stepper motor 10 drives the rotating disc 7 to rotate. The cam 9 is fixedly connected to the rotating disc 7 through bolts, and the inner wall of the base 8 is provided with the clamping groove matching the cam 9, so when the cam 9 rotates to the clamping groove in the base 8, the cam 9 can be inserted into the clamping groove, thereby achieving a tight connection between the rotating disc 7 and the base 8. On the contrary, quick disassembly of the rotating disc 7 and the base 8 can be achieved. In this way, quick disassembly and assembly of connecting parts can be achieved, thereby further improving assembly efficiency.

A support rod 5 is detachably connected to a bottom of the first link rod 1 through a clamping member 23, and a bottom of the support rod 5 is in rotating fit with the second link rod 2 at the top of each layer.

Figure 3:
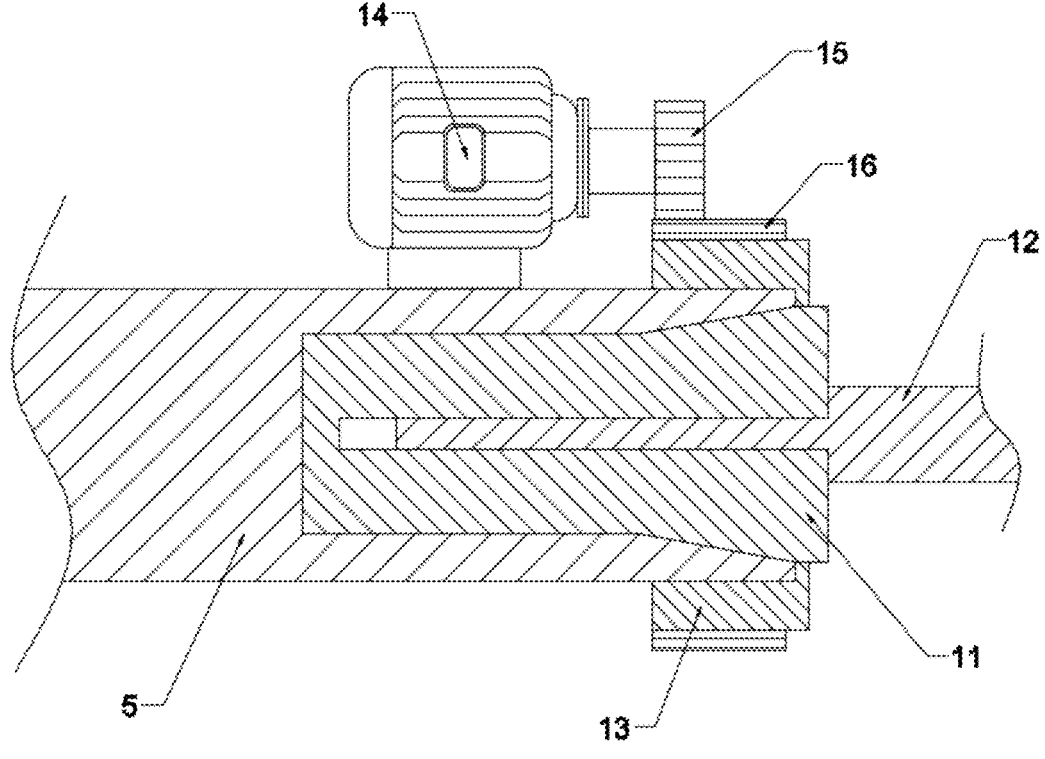
FIG. 3 is a front cross-sectional view of a clamping member of the on-orbit assembly auxiliary device for space structures according to an embodiment of the present invention.
Figure 4:
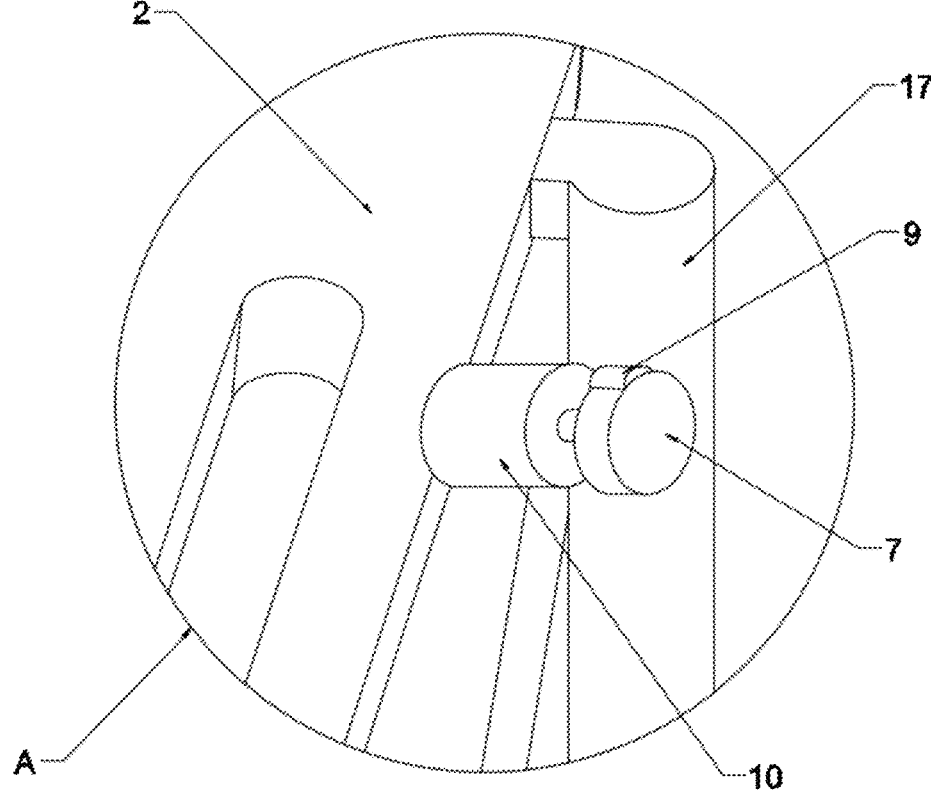
FIG. 4 is an enlarged view of part A in FIG. 1 according to an embodiment of the present invention.

As shown in FIG. 3, the clamping member 23 includes a plurality of clamping plates 11 arranged annularly, a top of the support rod 5 is provided with an opening, and the clamping plate 11 is located in the opening and is in sliding fit with the opening; the clamping plate 11 is in sliding fit with a strut 12, and the strut 12 is fixedly connected to the bottom of the first link rod 1 through a bolt; the top of the support rod 5 is in threaded fit with a nut 13, and the clamping plate 11 is clamped with an outer end of the opening and the nut 13; and a driving assembly for driving the nut 13 to rotate is provided on the nut 13.

The driving assembly includes a plurality of driving motors 14, gears 15, and racks 16; the driving motor 14 is fixedly connected to an outer side of the support rod 5, and the controller is used to control the operation of the driving motor 14; an output shaft of the driving motor 14 is fixedly connected to the gear 15 through a coaxial bolt, and the gear 15 meshes with the rack 16; and the rack 16 is sleeved on an outer side of the nut 13.

The driving motor 14 drives the gear 15 to rotate, and the gear 15 drives the rack 16 meshing with the gear to rotate.

As the rack 16 is sleeved on the outer side of the nut 13 and the nut 13 is in threaded fit with the support rod 5, the rack 16 can drive the nut 13 to rotate outside the support rod 5, thereby enabling the nut 13 to clamp or loosen the clamping plate 11. By accurately controlling the operation of the driving motor 14, the position of the nut 13 can be accurately adjusted, thereby ensuring accurate clamping of a clamped object by the clamping plate 11.

When the support rod 5 needs to be fixed to the bottom of the first link rod 1, the strut 12 fixedly connected to the first link rod 1 through bolts is placed in the clamping plate 11 arranged annularly, and the clamping plates 11 are closed to each other by tightening the nuts 13, thereby clamping the strut 12 for fixing. On the contrary, the strut 12 can be released by loosening the nut 13. The designed clamping plates 11 are highly adaptive to clamped objects of different sizes, shapes, and weights, making the assembly auxiliary device play an important role in various on-orbit assembly scenarios of space structures.

A specific implementation process is as follows: The plurality of second link rods 2 are hinged to the first link rod 1, and the rotating motor 6 is fixedly connected to the second link rod 2 at the top through bolts, so the second link rods 2 can be expanded or contracted through the rotating motor 6 at the top. The second link rod 2 is provided with the chute allowing the first slider 20 and the second slider 21 to move, and every two adjacent first sliders 20 are rotatably connected through the first hinge rod 3; and every two adjacent second sliders 21 are connected through the third hinge rod 19. Therefore, when the second link rod 2 at the top expands outward, the second link rods 2 in the middle can be sequentially driven to expand through the first hinge rods 3 and the third hinge rods 19. On the contrary, when the second link rod 2 contracts inward, the second link rods 2 in the middle can be sequentially driven to contract towards the first link rods 1 through the first hinge rods 3 and the third hinge rods 19, thereby opening and closing the second link rods 2.

Taking FIG. 1 as an example, when the rotating motor 6 drives the second link rod 2 at the top to rotate to the right, the second link rod 2 can drive the first hinge rod 3 and the third hinge rod 19 to expand sequentially, thereby enabling the structure to expand outward. On the contrary, when the rotating motor 6 drives the second link rod 2 at the top to move to the left, this structure can be contracted. Therefore, the spatial structure of the entire device is adjusted. This design enables the device to flexibly meet different space requirements during assembly and disassembly, thereby improving the flexibility and efficiency of the assembly process. The designed folding structure can occupy less space in a launching phase, thereby reducing launch costs.

Through the base 8 and the rotating disc 7, the first link rod 1 and the second link rod 2 at the top of each layer can be connected or disassembled. The plurality of second link rods 2 or sector-shaped structures can be spliced into a large annular structure according to task requirements to meet various application scenarios of space station maintenance, expansion, antenna array deployment, etc. Through the clamping plates 11, the plurality of support rods 5 can be detachably connected to each other to build a multi-layer support structure. Various complex space structures, such as multi-layer platforms, three-dimensional frames, and scalable antenna brackets, can be built, thereby expanding the application scope of space structures.

Embodiment 2

As shown in FIG. 3, the difference from the above is that the annular diameter of the clamping plate 11 at the opening of the support rod 5 is greater than that of the clamping plate 11 inside the opening of the support rod 5.

A specific implementation process is as follows: Based on the principles of leverage and mechanical balance, when the clamping plate 11 has a relatively large annular diameter at the opening of the support rod 5, the clamping force or supporting force provided by the clamping plate increases correspondingly. A larger diameter means a longer force arm, thereby generating a larger torque under the same force to clamp or support an assembly object more firmly.

Embodiment 3

As shown in FIG. 1, the difference from the above is that a second hinge rod 4 is hinged to an end, away from the rotating motor 6, of the second link rod 2; the adjacent second hinge rods 4 are hinged to each other; and the second hinge rod 4 on the side close to the first link rod 1 is hinged to the first link rod 1.

A specific implementation process is as follows: When the second link rod 2 at the top expands outward, the second link rods 2 in the middle are sequentially driven to expand through the first hinge rods 3. With the expansion of the second link rods 2, the second hinge rods 4 also expand to form a stable structure. By designing the second hinge rods 4, the structure is more flexible during expansion and contraction, and the size and shape of the structure can be adjusted as needed.

Embodiment 4

As shown in FIG. 1, the difference from the above is that a vertical rod 17 is detachably clamped and connected to the outer side of each layer of first link rods 1 and second link rods 2; and a tilt rod 18 is detachably clamped and connected between the vertical rod 17 and the support rod 5.

A specific implementation process is as follows: The designed vertical rod 17 and tilt rod 18 can be detachably clamped and connected through the quick disassembly member 22 and the clamping member 23, where the quick disassembly member 22 and the clamping member 23 are installed at corresponding positions. The device has strong applicability. A more stable framework structure can be formed to resist various forces and moments that may be encountered during on-orbit assembly, thereby improving the stability of the device.

Embodiment 5

As shown in FIG. 1 to FIG. 4, the difference from the above is that the first link rods 1, the second link rods 2, the support rods 5, the vertical rods 17, and the tilt rods 18 are all made by composite additive manufacturing, while the first hinge rods 3 and the second hinge rods 4 are both made of a shape memory material.

A specific implementation process is as follows: The composite material has the advantages of light weight, high strength, corrosion resistance, etc., and is suitable for application in space environments. Through additive manufacturing technology, these components can be directly manufactured in space, thereby reducing launch costs and improving design flexibility. The shape memory material has unique recovery characteristics, can restore to a preset shape at a specific temperature, and can further ensure the opening and closing of the structure, thereby improving stability.

The technical means disclosed in the solutions of the present invention are not limited to the technical means disclosed in the foregoing embodiments, but also include technical solutions formed by any combination of the above technical features.

What is claimed is:

1. An on-orbit assembly auxiliary device for space structures, comprising: a plurality of first link rods, wherein an end of each of the plurality of first link rods is hinged with a plurality of second link rods, respectively, and an opening assembly for expanding each of the plurality of second link rods is provided on each of the plurality of second link rods; the opening assembly comprises a plurality of first hinge rods and a plurality of third hinge rods, and each of the plurality of second link rods is provided with a chute; a first slider and a second slider are slidably provided in each chute; every two adjacent ones of the first sliders are rotatably connected through a respective one of the plurality of first hinge rods; every two adjacent ones of the second sliders are connected through a respective one of the plurality of third hinge rods; each of the first sliders adjacent to respective ones of the of the plurality of first link rods is rotatably connected to each of the respective plurality of first link rods through one of the first hinge rods; a rotating assembly for providing a rotational force is provided on a top second link rod of the plurality of second link rods; each of the plurality of first link rods is detachably connected to each of the respective plurality of second link rods at a top of one of the second link rods through a quick disassembly member to form a respective layer; a support rod is detachably connected to a bottom of each of the plurality of first link rods through a clamping member, respectively; a bottom of the support rod is in rotating fit with each of the plurality of second link rods at the top of each respective layer; a plurality of second hinge rods are hinged to an end, away from a rotating motor, of each of the plurality of second link rods, and adjacent second hinge rods are hinged to each other; and the second hinge rod on a side adjacent to each of the plurality of first link rods is hinged to each of the plurality of first link rods, respectively.

2. The on-orbit assembly auxiliary device for the space structures according to claim 1, wherein the rotating assembly comprises the rotating motor, and the rotating motor is electrically connected to a controller; and the rotating motor is fixedly connected to the top second link rod through bolts, and an output shaft of the rotating motor is fixedly connected to a hinged position of the top second link rod.

3. The on-orbit assembly auxiliary device for the space structures according to claim 2, wherein the quick disassembly member comprises a plurality of rotating discs and a base, and the plurality of rotating discs are all in rotating fit with the base; the base is fixedly connected to an outer wall of each of the plurality of first link rods, respectively, and each of the plurality of rotating discs is installed on an outer side of each the plurality of second link rods at the top of each respective layer; a cam is fixedly connected to each of the plurality of rotating discs, and an inner wall of the base is provided with a clamping groove for clamping the cam; and the rotating assembly for driving each of the plurality of rotating discs to rotate is provided on each of the plurality of rotating discs.

4. The on-orbit assembly auxiliary device for the space structures according to claim 3, wherein the rotating assembly further comprises a stepper motor, and the controller is configured to control operation of the stepper motor; and an output shaft of the stepper motor is coaxially and fixedly connected to each of the plurality of rotating discs, and the stepper motor is fixedly connected to an outer wall of each of the plurality of second link rods at the top of each respective layer.

5. The on-orbit assembly auxiliary device for the space structures according to claim 4, wherein the clamping member comprises a plurality of clamping plates arranged annularly, a top of each respective support rod is provided with an opening, and each of the plurality of clamping plates is located in the opening and is in sliding fit with the opening, respectively; each of the plurality of clamping plates is in sliding fit with a strut, and the strut is fixedly connected to the bottom of each of the plurality of first link rods; the top of the support rod is in threaded fit with a nut, and each of the plurality of clamping plates is clamped with an outer end of the opening and the nut; and a driving assembly for driving the nut to rotate is provided on the nut.

6. The on-orbit assembly auxiliary device for the space structures according to claim 5, wherein the driving assembly comprises a plurality of driving motors, gears, and racks; each of the plurality of driving motors is fixedly connected to an outer side of the respective support rod, and the controller is configured to control operation of each of the plurality of driving motors; an output shaft of each of the plurality of driving motors is coaxially and fixedly connected to each of the gears, and each of the gears meshes with each of the racks; and each of the racks is sleeved on an outer side of the nut.

7. The on-orbit assembly auxiliary device for the space structures according to claim 5, wherein an annular diameter of one of the clamping plates at the opening of the support rod is greater than an annular diameter of one of the clamping plates inside the opening of the support rod.

8. The on-orbit assembly auxiliary device for the space structures according to claim 1, wherein a vertical rod is detachably clamped and connected to an outer side of each layer of first link rods and second link rods; and a tilt rod is detachably clamped and connected between the vertical rod and a respective one of the support rods.

9. The on-orbit assembly auxiliary device for the space structures according to claim 8, wherein the plurality of first link rods, the plurality of second link rods, support rods, vertical rods, and tilt rods are all made by composite additive manufacturing, while the plurality of first hinge rods and the second hinge rods are both made of a shape memory material.

* * * * *